United States Patent [19]

Garza

[11] Patent Number: 5,268,183
[45] Date of Patent: Dec. 7, 1993

[54] MOLD APPARATUS HAVING AN OUTWARDLY ANGLED SEAL FOR ENCAPSULATING A GLASS SHEET

[75] Inventor: Luis A. A. M. Garza, Condesa, Mexico

[73] Assignee: Vidrio Plano De Mexico, S.A., Mexico

[21] Appl. No.: 519,395

[22] Filed: May 4, 1990

[51] Int. Cl.⁵ .............................................. B29C 45/14
[52] U.S. Cl. ................................... 425/116; 264/252; 425/129.1
[58] Field of Search ............... 264/252; 425/543, 544, 425/557, 573, 585, 588, 116, 117, 121, 129.1; 249/134, 135, 117, 119, 127, 128

[56] References Cited

U.S. PATENT DOCUMENTS

| | | | |
|---|---|---|---|
| 2,258,724 | 10/1941 | Wagner et al. | 20/40 |
| 2,342,758 | 2/1944 | Saunders et al. | 296/84 |
| 2,576,392 | 11/1951 | Downes | 189/64 |
| 2,645,827 | 7/1953 | Koll | 20/56.4 |
| 2,701,041 | 2/1955 | Toth | 189/78 |
| 2,718,664 | 9/1955 | Schweitzer | 18/30 |
| 2,736,067 | 2/1956 | Boschi | 18/59 |
| 2,966,435 | 12/1960 | Kassinger | 154/2.71 |
| 3,263,014 | 7/1966 | Deisenroth | 264/261 |
| 3,381,340 | 5/1968 | Chapin | 18/36 |
| 3,430,333 | 3/1969 | Hodgen | 29/472.9 |
| 3,440,121 | 4/1969 | Shockey | 156/293 |
| 3,459,407 | 8/1969 | Hazlehurst et al. | 259/4 |
| 3,523,994 | 8/1970 | Shockey | 264/252 |
| 3,659,896 | 5/1972 | Smith et al. | 296/93 |
| 3,671,370 | 6/1972 | Littell | 161/43 |
| 3,719,222 | 3/1973 | Harding et al. | 160/371 |
| 3,744,201 | 7/1973 | Dochnahl | 52/400 |
| 3,759,004 | 9/1973 | Kent | 52/400 |
| 3,776,591 | 12/1973 | Krueger | 296/146 |
| 3,843,982 | 10/1974 | Lane et al. | 9/1 |
| 3,851,432 | 12/1974 | Griffin | 52/400 |
| 3,924,989 | 12/1975 | Althausen et al. | 425/130 |
| 3,968.612 | 7/1976 | Endo et al. | 52/400 |
| 4,007,536 | 2/1977 | Soderberg | 29/421 |
| 4,072,340 | 2/1978 | Morgan | 296/84 |
| 4,072,673 | 2/1978 | Lammers | 264/225 |
| 4,097,928 | 6/1978 | Fries | 366/336 |
| 4,135,180 | 1/1979 | White | 366/336 |
| 4,139,234 | 2/1979 | Morgan | 296/84 |
| 4,151,696 | 5/1979 | Knights et al. | 52/741 |
| 4,190,711 | 2/1980 | Zdrahala et al. | 521/112 |
| 4,249,517 | 2/1981 | Schroeder et al. | 126/450 |
| 4,255,367 | 3/1981 | Wallace et al. | 264/45.1 |
| 4,265,965 | 5/1981 | Chancler | 428/315 |

(List continued on next page.)

FOREIGN PATENT DOCUMENTS

| | | |
|---|---|---|
| 57-158481 | 9/1982 | Japan . |
| WO 85/04168 | 4/1985 | PCT Int'l Appl. . |
| 695257 | 8/1953 | United Kingdom . |

Primary Examiner—Jay H. Woo
Assistant Examiner—Robert B. Davis
Attorney, Agent, or Firm—Vinson & Elkins

[57] ABSTRACT

A mold apparatus for forming encapsulated glass which includes the use of a plurality of mold sections 10 and 12 which, when closed, cooperate with a sheet 5 and at least one seal 25 to define a gasket forming cavity 35. When a gasket forming material is injected into the gasket forming cavity 35 and is allowed to at least partially cure, a gasket 2 is formed on at least a portion of the sheet 5 to produce a window gasket assembly 50. A seal 25 with an outwardly angled facing portion 27 defines an interior face 37 of the gasket forming cavity 35 and prevents leakage of the gasket forming material and the formation of flash on the sheet 5. In one embodiment of the invention, the mold section 12 is made of a resilient material and mold section 10 is made of a rigid material. In another embodiment of the invention, mold section 12 has positioned therewithin a rigid member 45 having a finishing surface 48 which cooperates with the seal 25 and the sheet 5 to define a gasket forming cavity 35. The finishing surface 48 of the rigid member 45 defines a face portion of the window gasket assembly 50.

26 Claims, 5 Drawing Sheets

OTHER PUBLICATIONS

| Patent No. | Date | Inventor | Class |
|---|---|---|---|
| 4,284,673 | 8/1981 | Ockels | 428/54 |
| 4,303,728 | 12/1981 | Houdek et al. | 428/315 |
| 4,336,009 | 6/1982 | Wolf | 425/116 |
| 4,364,214 | 12/1982 | Morgan et al. | 52/311 |
| 4,364,595 | 12/1982 | Morgan et al. | 296/84 |
| 4,387,923 | 6/1983 | Choby et al. | 296/201 |
| 4,389,068 | 6/1983 | Sengoku | 296/206 |
| 4,389,069 | 6/1983 | Sengoku | 296/206 |
| 4,487,448 | 12/1984 | Griffin | 296/146 |
| 4,561,625 | 12/1985 | Weaver | 249/85 |
| 4,584,155 | 4/1986 | Zanella | 264/252 |
| 4,585,829 | 4/1986 | Kuo et al. | 524/714 |
| 4,591,203 | 5/1986 | Furman | 296/201 |
| 4,618,322 | 10/1986 | Lagasse | 425/129 |
| 4,626,185 | 12/1986 | Monnet | 425/110 |
| 4,648,832 | 3/1987 | Reilly et al. | 425/543 |
| 4,662,113 | 5/1987 | Weaver | 49/404 |
| 4,688,752 | 8/1987 | Barteck et al. | 249/85 |
| 4,700,525 | 10/1987 | Nieboer et al. | 52/698 |
| 4,723,809 | 2/1988 | Kida et al. | 296/84 |
| 4,732,553 | 3/1988 | Hofer | 425/116 |
| 4,755,339 | 7/1988 | Reilly et al. | 264/252 |
| 4,756,767 | 7/1988 | Soni et al. | 134/3 |
| 4,761,916 | 8/1988 | Sanok et al. | 49/381 |
| 4,762,481 | 8/1988 | Weaver | 425/116 |
| 4,778,366 | 10/1988 | Weaver | 425/110 |
| 4,795,667 | 1/1989 | Armstrong | 428/77 |
| 4,824,628 | 4/1988 | Curfman | 264/225 |
| 4,826,417 | 5/1989 | Reilly et al. | 425/116 |
| 4,830,804 | 5/1989 | Weaver | 264/139 |
| 4,834,929 | 5/1989 | Dehoff et al. | 264/266 |
| 4,834,931 | 5/1989 | Weaver | 264/252 |
| 4,839,122 | 6/1989 | Weaver | 264/129 |
| 4,854,599 | 8/1989 | Barteck | 277/227 |
| 4,999,147 | 3/1991 | Kojima et al. | 264/592 |
| 5,061,429 | 10/1991 | Yoshihara | 264/252 |
| 5,068,076 | 11/1991 | Weaver | 264/252 |
| 1080271 | 8/1967 | United Kingdom . | |
| 1478714 | 7/1977 | United Kingdom . | |
| 1502735 | 3/1978 | United Kingdom . | |
| 1523547 | 9/1978 | United Kingdom . | |
| 2049542A | 12/1980 | United Kingdom . | |
| 2057338A | 4/1981 | United Kingdom . | |
| 2115049A | 9/1983 | United Kingdom . | |
| 2141375A | 12/1984 | United Kingdom . | |
| 2147244A | 5/1985 | United Kingdom . | |
| 2079667A | 1/9182 | United Kingdom . | |

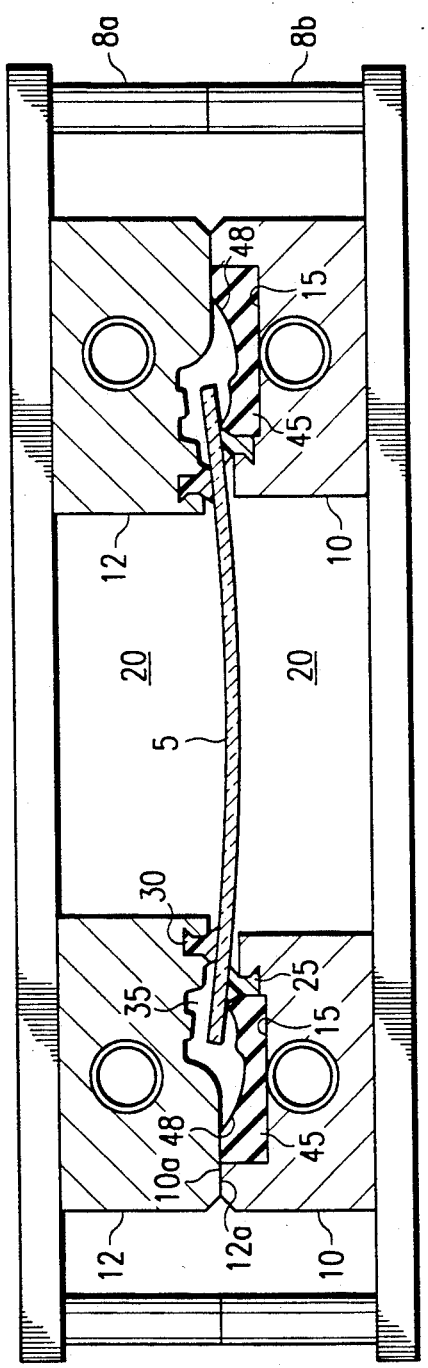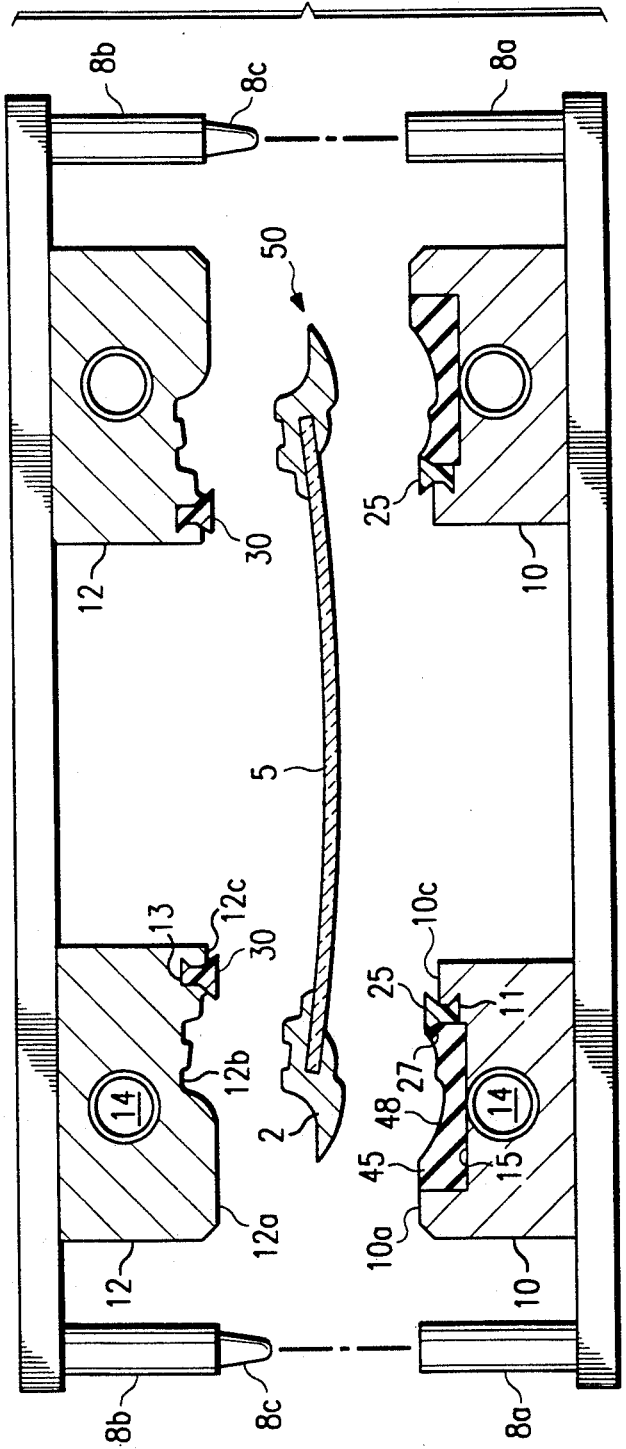

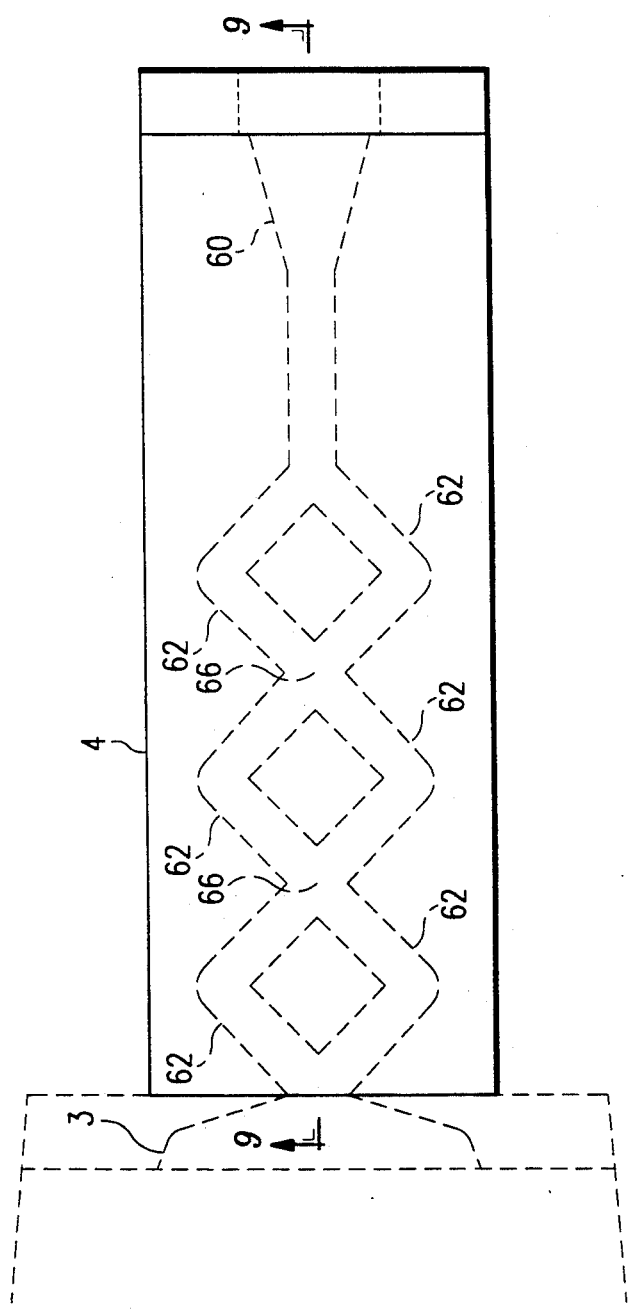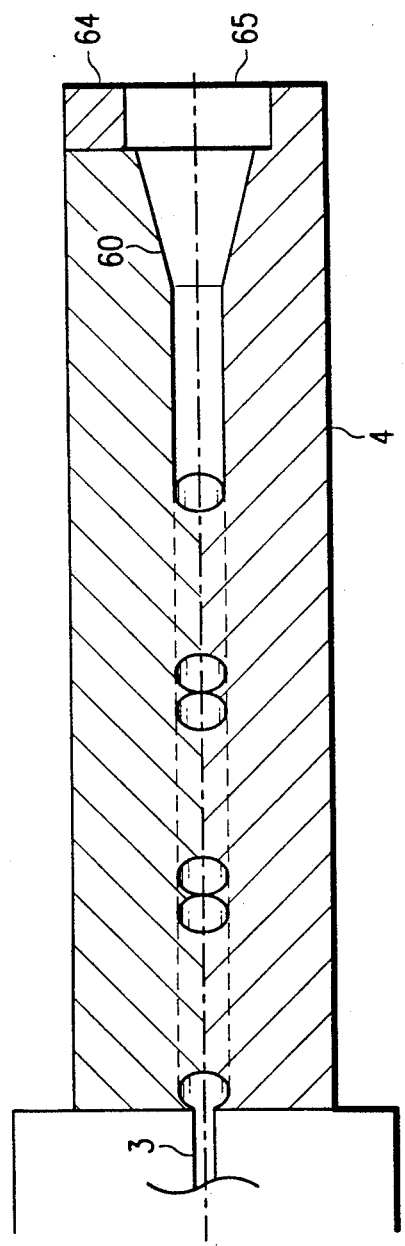

MOLD APPARATUS HAVING AN OUTWARDLY ANGLED SEAL FOR ENCAPSULATING A GLASS SHEET

BACKGROUND OF THE INVENTION

The present invention relates to an improved mold apparatus and method for producing encapsulated glass. More particularly, the invention relates to a mold apparatus and method for producing an encapsulated window assembly including a glass sheet and a gasket of a polymeric material which is formed to encapsulate the peripheral edge of the sheet. Typically, the gasket is formed by a reaction injection molding process.

Conventional window assemblies for automobiles have been provided with a number of different elements. The bedding, or embedding or encapsulating, of glass window sheets into metal frames so as to form assemblies to be subsequently attached to an automobile body, has been done in the past by manual assembly techniques. Such manual techniques included inserting a window glass sheet into a frame, then covering the edge of the glass sheet with a strip of rubber, which was inserted into the metal frame holding the glass sheet. The edges of the rubber strip extending out of the frame were trimmed off by the use of a hot knife. This process was expensive due to the fairly high cost of the labor involved. Other problems arose as well, such as the costs of the additional step of cleaning or washing the window assembly and the inability of the window assemblies so formed to withstand the weather. As a result of such disadvantages, techniques for automatically bedding the glass sheets into such a frame have been developed. An example of such a method and apparatus is described in U.S. Pat. No. 3,263,014, which is incorporated herein by reference.

Early window assemblies often included a number of different elements, including adhesive sealants applied around the peripheral edges of the glass sheet, suitable mechanical fasteners such as metal clips, and exterior trim pieces. Subsequent window assemblies were developed in attempts to further improve on the earlier window assemblies. An illustration of a more recent window assembly is provided in U.S. Pat. No. 4,072,340, which is incorporated herein by reference. The window assembly disclosed in this latter patent includes a glass sheet, a frame, fasteners for affixing the assembly to a vehicle, and a casing or gasket of a molded material extending between the frame and the edge of the glass sheet. The purpose of such a gasket is to hold the glass sheet and the frame together.

In connection with the manufacture of window gasket assemblies of the more recent design, a mold apparatus is used. The mold typically used includes two mold sections which define a chamber for receiving the sheet. Such molds also include a gasket forming cavity formed by the cooperation of the mold sections, the sheet (around the peripheral edge of which a gasket is to be formed), and one or more seals positioned within the mold sections. A smooth and polished finish on any exposed surface, usually the exterior facing surface of the window gasket assembly as it is to be installed in an automobile window opening, is desired for aesthetic reasons. It is therefore desirable to have the facing surface of the mold section which defines an exposed or exterior surface of the window gasket assembly finished or polished so as to provide a smooth and finished surface of the gasket assembly. However, it is undesirable for the mold sections to come into contact with the glass sheet. Such contact often results in excessive fracturing or scratching of the glass sheet. Thus, a chamber in which the glass sheet is to be positioned is often formed in the interior of the mold so that the sheet, around the periphery of which an encapsulating gasket is to be formed, is not in contact with the mold sections.

A seal is conventionally provided within the mold to prevent the gasket forming material from leaving the gasket forming cavity. Even with such a seal, the leakage of the gasket forming material onto the sheet to form a layer of flash is common in conventional molds. In the past, this problem has been addressed by allowing for a flashing space defined by a seal, the glass sheet, the mold section with the facing surface, and the gasket forming cavity. During the molding process, some of the material being molded as a gasket enters the flashing space from the gasket forming cavity and cures on the glass sheet. An example of such a prior art mold apparatus and method is illustrated in U.S. Pat. No. 4,688,752, which is incorporated herein by reference. The production of such flash on the glass sheet, however, is undesirable as the flash is usually removed for aesthetic reasons prior to the installation of the window assembly on an automobile body. The added step of removing the flash creates additional labor costs and waste.

The glass sheets used in the manufacture of window gasket assemblies (or "unitary" assemblies) are typically produced with irregularities in the surface. Additionally, the glass sheets used in manufacturing such assemblies often have a curved configuration by design. Such curved configurations also produce difficulties in connection with a lack of uniformity among and the tolerances for curved sheets with respect to the dimensions of the sheets. Prior art mold sections used in manufacturing such assemblies have been made of steel or other metals. In the manufacturing process, the mold sections are brought together when the mold is closed; in some instances, the mold sections may be clamped together at a relatively high pressure. Since the steel surfaces of the mold sections do not yield or conform to irregularities in the surface of the glass sheet, the glass sheet may be fractured or scratched by the mold sections. Additionally, the glass sheet may be scratched during the steps of inserting and removing the glass sheets into and from the mold sections if the glass sheet slips. The breakage or scratching of a glass sheet renders the glass sheet useless as a window assembly and thus results in extra costs. Other disadvantages of such metallic mold sections are the costs of the mold sections themselves and also the amount of time and effort needed to make and modify such mold sections.

SUMMARY OF THE INVENTION

The present invention concerns an improved mold apparatus and method for at least partially encapsulating a sheet by forming a window assembly comprising a gasket and a sheet. The present invention may be incorporated into a mold which includes at least two cooperating mold sections having facing surfaces which define a chamber for receiving the glass sheet. A seal is positioned in at least one of the facing surfaces of a mold section to resiliently support the sheet and to cooperate with the sheet and at least one facing surface of a mold section to define a gasket forming cavity. According to the invention, the seal has an angled facing portion which cooperates with at least one facing surface of a mold section located outwardly of the seal and with the sheet so as to define a gasket forming cavity having an interior face defined by the angled facing portion of the seal between the sheet and the facing surface of the mold section. This provides the benefit of preventing the formation of flash on the sheet, while allowing a smooth and aesthetically acceptable face portion of the gasket to be formed.

According to another aspect of the invention, at least one of the mold sections is made of a resilient material. An opposing rigid mold section may further have at least one finishing surface which, together with the seal and the sheet, cooperates to define a gasket forming cavity wherein the finishing surface provides a smooth and finished surface on the window gasket assembly formed by the mold.

In addition and alternatively, the invention also may be used with the rigid mold section having positioned therewithin at least one rigid member having at least one finishing surface which, together with a seal having an outwardly angled facing portion and the sheet, defines a gasket forming cavity so that the finishing surface of the rigid member can provide a smooth and finished surface on a portion of the window gasket assembly formed by the mold.

Accordingly, it is an object of the present invention to provide a mold apparatus and method for forming a gasket on a glass sheet which avoids the creation of flash on the surface of the sheet around which a gasket is to be formed.

It is another object of the present invention to provide a mold apparatus and method for forming a gasket on a glass sheet which eliminates the step of removing flash created on the surface of the sheet around which a gasket is to be formed.

It is another object of the invention to provide a mold apparatus and method for forming a gasket on a glass sheet which provides an aesthetically acceptable face portion on the gasket without the formation of flash on the glass sheet.

It is another object of the invention to provide a mold apparatus and method for forming a gasket around a glass sheet without the use of metallic mold sections.

It is another object of the invention to provide a mold apparatus and method for forming a gasket on a glass sheet, whereby the risk of breaking or scratching the sheet, around which a gasket is to be formed, is minimized.

It is another object of the invention to provide a mold apparatus and method for forming a gasket on a glass sheet which minimizes the risk of breaking or scratching the sheet, around which a gasket is to be formed, while at the same time providing an aesthetically acceptable exterior face of the window gasket assembly.

It is another object of the invention to provide a mold apparatus and method for forming a gasket on a glass sheet which includes the use of a resilient mold section.

It is another object of the invention to provide a mold apparatus and method for forming a gasket on a glass sheet which is relatively inexpensive and is relatively easy to make and modify.

The above and other advantages of the present invention will become readily apparent to those skilled in the art from the following detailed description of the invention, and from the attached drawings, which are briefly described below.

BRIEF DESCRIPTION OF THE DRAWINGS

FIG. 5 is an enlarged sectional view of an alternative embodiment of the mold apparatus, showing the mold apparatus in a closed position.

FIG. 7 is an enlarged sectional view of an alternative embodiment of the mold apparatus, showing the mold apparatus in an open position and showing the formed window gasket assembly.

FIG. 8 is an enlarged plan view of an aftermixer used in conjunction with the mold apparatus.

FIG. 9 is an enlarged sectional view taken along line 9—9 of FIG. 8, showing an aftermixer used in conjunction with the mold apparatus.

DETAILED DESCRIPTION OF THE INVENTION

Figures 1, 2:
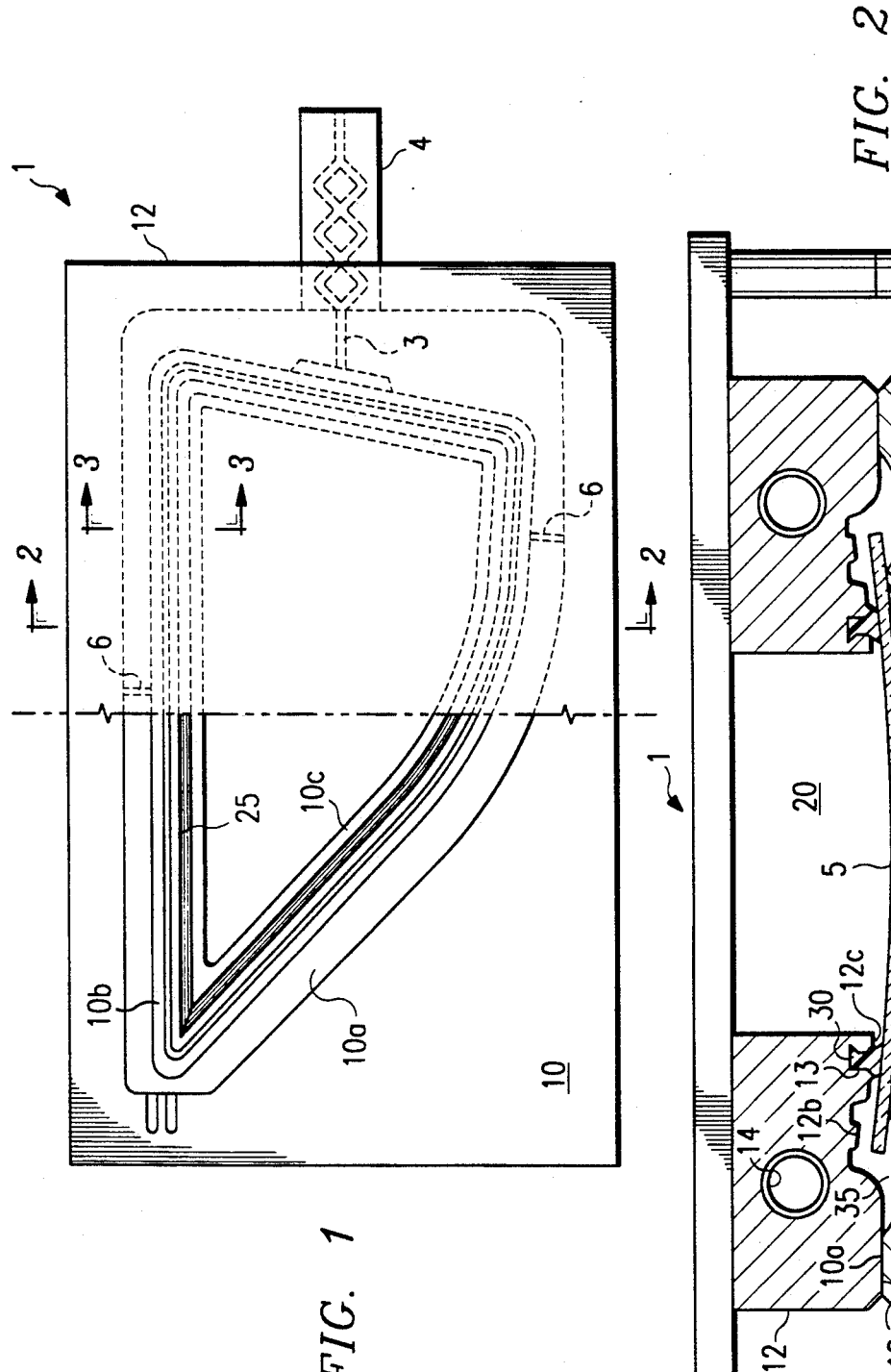
FIG. 1 is a top view of a mold apparatus according to the present invention, with the right portion providing a top view of the upper mold section and the left-hand portion providing a top view of the lower mold section.
FIG. 2 is an enlarged sectional view taken along line 2—2 of FIG. 1, showing the mold apparatus in a closed position with the sheet located therein.

Referring to FIGS. 1 and 2, there is shown a mold apparatus 1 embodying the features of the present invention. As will be discussed below, the mold apparatus 1 is specifically adapted to form a gasket 2, as described in detail below and shown in FIG. 7, about the periphery of a glass sheet 5. The terms "glass sheet" and "sheet" as used herein will be understood to mean any sheet of material, such as a sheet made of glass, "PLEXIGLASS", or some other plastic or other material. The sheet may be transparent or clear, translucent, or opaque; if desired, the sheet may be colored, tinted, or reflective. In addition, the sheet may be provided with protection from ultraviolet (UV) radiation, such as by coating the sheet with a layer of paint providing such UV protection. In the preferred embodiment, a window gasket assembly 50, which includes a gasket 2 and a sheet 5, is adapted to be used to fill an aperture or opening in a vehicle body, such as in automobiles, trucks, and other vehicles. It will also be appreciated, however, that the claimed invention may also be used in conjunction with window gasket assemblies in other applications, including not only automotive but also architectural, appliance, boating, and other applications. Moreover, the claimed invention may be used to form a part of a vehicle body, in which case the sheet would be a portion of the body of the vehicle.

The mold apparatus 1 is comprised of a lower mold section 10 and an upper mold section 12. The mold apparatus 1 is inserted into or placed on a conventional mold press or other similar apparatus (not shown) of a type which is well known in the art, and which will open and close mold sections 10 and 12 in a conventional manner. As shown in FIG. 2, each of the mold sections 10 and 12 includes passageways 14 for circulating either a cooled or a heated fluid through the respective mold sections 10 and 12. Such passageways 14 allow control of the temperature of the mold sections 10 and 12 and of the gasket forming cavity 35 discussed below. Other techniques for controlling the temperature can also be provided. For example, heating elements such as electrical wires disposed within the mold sections 10 and 12 could be used to control the temperature of the mold sections 10 and 12 and of the gasket forming cavity 35.

Also shown in FIG. 2 are stopping pins 8a and 8b. In the mold apparatus 1 of FIG. 2, the stopping pins 8a and 8b (shown in a closed position) are located outwardly of the mold sections 10 and 12. In the preferred embodiment, stopping pins 8a and 8b are substantially rigid and thereby serve to limit and define the closure of the mold sections 10 and 12, and to limit or minimize the compression of the seals 25 and 30 (described below) and the deformation of the gasket forming cavity 35. It will be understood, however, that the stopping pins 8a and 8b may alternatively be located within the mold sections 10 and 12, or interior of mold sections 10 and 12, or in some combination thereof.

Referring now to FIG. 7, the mold apparatus 1 and the stopping pins 8a and 8b are shown in an open position. The stopping pins 8a and 8b of this embodiment include lower stopping pins 8a, and upper stopping pins 8b with extending tip portions 8c. Each lower stopping pin 8a is substantially cylindrical in shape and has an open end for receiving the extending tip portion 8c of the corresponding upper stopping pin 8b. The tip portions 8c of the upper stopping pins 8b serve to guide and position the upper stopping pins 8b and corresponding upper mold section 12 as they are lowered, respectively, onto lower stopping pins 8a and corresponding mold section 10 when the mold apparatus 1 is closed. As shown in FIG. 7, the tip portions 8c in a preferred embodiment are substantially conically shaped and adapted for engagement with the open ends of the lower stopping pins 8a. The closure of the mold sections 10 and 12 also can be limited and defined by the contact of portions of the abutting portions 10a and 12a of the facing surfaces (described below) located outwardly of the gasket forming cavity 35 (also described below).

Referring to FIGS. 1 and 2, both of mold sections 10 and 12 are preferably made of resin materials, with upper mold section 12 made of a resilient material and lower mold section 10 made of a rigid material. In a preferred embodiment of the invention, the resilient material is a resin made from 100 parts by weight "UREOL 6414 A" and 64 parts by weight "UREOL 6414 A", both of which are commercially available from CIBA GEIGY, with the rigid material a resin made from 100 parts by weight "ARALDIT CW217" and 10 parts by weight hardener "HY956", both of which are also commercially available from CIBA GEIGY. In the preferred embodiment of the invention, the rigid resin material further includes particles of a metallic dust. A charge of aluminum dust included with the rigid resin material is used in the preferred embodiment of the invention. It will be understood, however, that other types of metallic particles may be used, such as bronze or steel dust, or a mixture thereof. The charge of a metallic dust included in the rigid resin material further enhances the ability of the rigid mold section 10 to conduct heat energy and also enhances the smoothness of the finish on the face or surface portion of the gasket 2 molded by the rigid material.

As used herein, the term "resilient" refers to the material's flexibility. The resilient material comprising the mold section 12 is preferably flexible enough to allow the mold section 12 to sufficiently give or flex so as to form a sealing contact with the mold section 10 when the two mold sections 10 and 12 are closed and clamped together. At the same time, however, the resilient mold section 12 must be firm enough to keep its shape; i.e., the mold section 12 cannot be deformed to the extent that the shape of the gasket forming cavity 35 (as shown in FIG. 2 and discussed below) is undesirably altered when the two mold sections 10 and 12 are brought together and closed. In the preferred embodiment of the invention, the resilient mold section 12 has a Shore durometer hardness of approximately 50. The resilient mold section 12 provides the advantages of being more easily modified than conventional mold sections to accommodate changes in the desired shape of the gasket 2 or the placement of outlet channels 6 than rigid mold sections. The resilient mold section 12 also avoids damage to the sheet 5, such as occurs by the scratching or fracturing of the sheet 5 by conventional mold sections. Additionally, the resilient mold section 12 is cheaper and can be prepared or modified more quickly than a mold section made of metal or other rigid material.

Referring to FIG. 1, the mold apparatus 1 includes inlet channel 3 for allowing the injection of a gasket forming material into the gasket forming cavity 35 (shown in FIG. 2). The inlet channel 3 is preferably in fluid communication with an aftermixer 4. The gasket forming material is injected into the aftermixer 4, is more thoroughly mixed by the aftermixer 4, and then travels through the inlet channel 3 and enters and fills the gasket forming cavity 35 (shown in FIG. 2). The aftermixer 4 is described more fully below and is shown in more detail in FIGS. 8 and 9.

Still referring to FIG. 1, outlet channels 6 are provided in the mold apparatus The outlet channels 6 allow fluid communication between the gasket forming cavity 35 (as described below and shown in FIG. 2) and the exterior of the mold apparatus 1. Typically, the outlet channels 6 comprise hollow cavities extending between the gasket forming cavity 35 and the exterior of the mold apparatus 1. Such outlet channels 6 allow air (or any other fluid) within the gasket forming cavity 35 to escape when the gasket forming cavity 35 is filled with a gasket forming material.

As shown in FIG. 2, the mold sections 10 and 12 are provided with facing surfaces. The facing surfaces of the mold sections 10 and 12 have interior recessed portions 10c and 12c, respectively, which cooperate so that when the mold sections 10 and 12 are brought together (or are in a closed position), the facing surfaces located interiorly of the gasket forming cavity 35 define an interior chamber 20 for receiving a glass sheet 5 on which a gasket 2 (shown in FIG. 7) is to be formed. Also as shown in FIG. 2, the recessed portions 10b and 12b of the facing surfaces of the mold sections 10 and 12, respectively, together with the seals 25 and 30 and the sheet 5, define the gasket forming cavity 35. Finally, as also shown in FIG. 2, the facing surfaces of the mold sections 10 and 12 include abutting portions 10a and 12a, respectively. When the mold apparatus 1 is closed, the mold sections 10 and 12 abut along the abutting portions 10a and 12a.

As further shown in FIG. 2, the mold apparatus 1 has an open interior portion so that mold sections 10 and 12 are roughly ring-shaped, each forming a ring roughly in the shape of the sheet 5 around which a gasket 2 (shown in FIG. 7) is to be formed. The open interior portions of such ring-shaped mold sections 10 and 12 cooperate with the recessed portions 10c and 12c to define the sheet receiving chamber 20. However, it will be understood that mold sections 10 and 12 need not be ring-shaped, but instead may extend continuously across the interior portion of the mold apparatus 1. The open interior portion of the mold apparatus 1 is preferred in order to avoid scratching the surface of or otherwise damaging the sheet 5 during the molding operation. An open interior portion also provides the advantage of using less material for the mold sections 10 and 12.

Positioned within the upper mold section 12 is a seal 30 positioned in a groove 13 formed in the facing surface of the upper mold section 12. Similarly, the seal 25 is positioned in a groove 11 in the lower mold section 10. Together, the seals 25 and 30 in the mold sections 10 and 12 cooperate to press yieldingly against the sheet 5 and to resiliently support the sheet 5 within the sheet receiving chamber 20. The sheet 5 thus can be held in a spaced-apart relationship with the interior portions of the mold sections 10 and 12. As shown in FIG. 2, the seals 25 and 30 and the mold sections 10 and 12 cooperate with the sheet 5 and the recessed portions 10b and 12b of the facing surfaces of the mold sections 10 and 12 to define a gasket forming cavity 35. Typically, the shapes and dimension of the recessed portions 10b and 12b are determined by the specified or desired shape of the gasket 2 to be formed on the sheet 5. As discussed below, a finishing surface 18 can be provided as a part of the recessed portion 10b so as to provide an aesthetically acceptable exterior finish on a corresponding face portion of the gasket 2 to be formed.

In the preferred embodiment of the invention, the seals 25 and 30 are made of silicone. It will be understood that the seals 25 and 30 also can be made of other flexible materials, such as neoprene. In the preferred embodiment of the invention, the seals 25 and 30 are removably positioned within the grooves 11 and 13, respectively. Those skilled in the art will understand that the seals 25 and 30 also can be securely held within the grooves 11 and 13, respectively. For example, an adhesive or glue could be used to securely hold the seals 25 and 30 within the grooves 11 and 13.

When the mold sections 10 and 12 are separated (or are in an open position) prior to molding, the sheet 5 is positioned on the lower mold section 10 so that an outer portion of the lower surface of the sheet 5 rests and is supported on a resilient lower seal 25. The lower seal 25 is positioned within a groove 11 formed in the facing surface of the lower mold section 10. Typically, the sheet 5 is positioned so that its lower surface, which rests on and is supported by the lower seal 25, is the surface of the sheet 5 which will face the exterior when the sheet 5 is installed (as part of a window gasket assembly 50) in a vehicle body. After the sheet 5 is suitably positioned, the mold sections 10 and 12 are brought together or are closed such as by lowering the upper mold section 12 so that the outer peripheral portions (i.e., the abutting portions 10a and 12a) of the facing surfaces of the mold sections 10 and 12 are brought together and abut one another. As discussed above, the amount of closure of the mold sections 10 and 12 also can be determined by stopping pins 8a and 8b. As discussed more fully below, a gasket forming material is then injected into the mold apparatus 1 and, after being allowed to at least partially cure or harden, the mold apparatus 1 can be opened and the sheet 5 with a molded gasket 2 thereon removed from the mold apparatus 1, as shown in FIG. 7.

The upper mold section 12 can be made resilient enough to allow it to contact sheet 5 on the interior portion of sheet 5 without damaging the sheet 5. Thus, the upper mold section 12 may be appropriately shaped to itself to provide a seal between the gasket forming cavity 35 and the interior chamber 20 and to prevent the formation of flash on sheet 5, without the use of an additional seal 30. The resilient mold section thus can provide the advantage of eliminating the need for an upper seal 30. If the upper mold section 12 is not sufficiently resilient, considering the frangibility of the sheet 5 and the force with which the mold sections 10 and 12 are closed, however, the use of the upper mold section 12 (without a seal 30) in direct contact with the sheet 5 may result in damage to the sheet 5, such as by fracturing or scratching.

When the mold sections 10 and 12 are brought together and closed, a gasket 2 (as is shown in FIG. 7) can be formed within the gasket forming cavity 35 by placing a gasket forming material into the gasket forming cavity 35. The placement of such a material can be accomplished by injection molding techniques known to those skilled in the art. In a preferred embodiment of the invention, the gasket forming material is injected into the gasket forming cavity 35 and is a polyurethane compound comprising a dye and a catalyst. After injection, the gasket forming material, preferably allowed to at least partially cure or harden within the gasket forming cavity 35, encapsulates an outer portion of the sheet 5. The outer portion of the sheet 5 to be encapsulated by gasket 2 thus in part defines the gasket forming cavity 35.

Figure 3A:
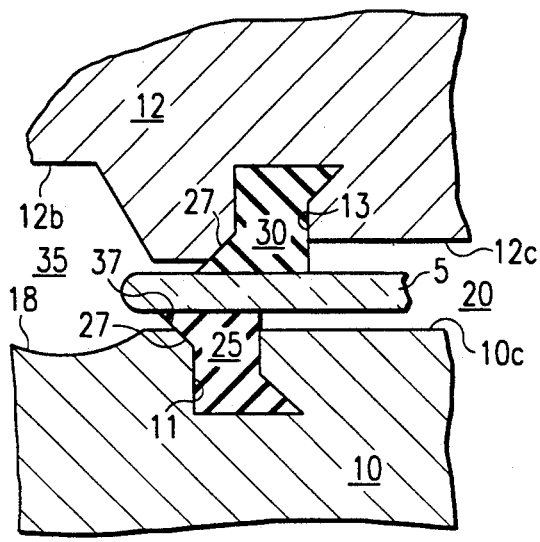
FIG. 3A is an enlarged fragmentary sectional view taken along line 3—3 of FIG. 1, showing the seal.

Referring now to FIG. 3A, an enlarged and fragmentary sectional view of the mold apparatus 1 showing the seals 25 and 30 is provided. As shown in FIG. 3A, the seals 25 and 30 shaped according to the invention are disposed within grooves 11 and 13 in the mold sections 10 and 12 and are located adjacent to and abut the sheet 5. As shown in FIG. 3A, the lower seal 25 has an inner side which is adjacent the interior sheet receiving chamber 20. The lower seal 25 also has an outer or exterior side which is adjacent to and cooperates to define the gasket forming cavity 35. Similarly, the upper seal 30 also has both an inner side and an outer side. The lower seal 25 has an angled facing portion 27 which extends outwardly from the sheet receiving chamber 20 and cooperates with a finishing surface 18 (which is a portion of the recessed portion 10b of the lower mold section 10) and the sheet 5, together with another similarly shaped seal 30 located within a groove 13 in the upper mold section 12, to define a gasket forming cavity 35. The seals 25 and 30 abut the sheet 5 and form a seal between the gasket forming cavity 35 and the sheet receiving chamber 20, thus preventing the leakage of a gasket forming material (when injected) from the gasket forming cavity 35 and the formation of flash on the sheet 5 (as discussed below).

Still referring to FIG. 3A, the gasket forming cavity 35 so defined has an interior face 37 located between the finishing surface 18 of the recessed portion 10b of mold section 10 and the sheet 5. The interior face 37 of the gasket forming cavity 35 is defined by the outwardly angled facing portion 27 of the lower seal 25. As shown in FIG. 3A, the angled facing portion 27 of the lower seal 25 is on the outer side of the lower seal 25. Similarly the angled facing portion 27 of the upper seal 30 is on the outer side of the upper seal 30. The outwardly angled facing portion 27 of the seal 25 extends outwardly from the sheet receiving chamber 20 (and the central interior area of the mold apparatus 1) and ascends towards the sheet 5 at an angle of approximately 45° from the vertical plane. As also shown in FIG. 3A, the angled facing portion 27 of the lower seal 25 is angled outwardly from the facing surface 10c (shown as horizontal) of the lower mold section 10. Similarly, the angled facing portion 27 of the upper seal 30 is angled outwardly from the facing surface 12c (shown as horizontal) of the upper mold section 12. The outwardly angled facing portion 27 cooperates with the gasket forming cavity 35 so that, when a gasket forming material is injected into the gasket forming cavity 35, the outwardly angled facing portion 2 of the seal 25 undercuts the interior face 37 of the gasket 2 formed within the gasket forming cavity 35. The outwardly angled facing portion 27 provides the advantage of more effectively preventing any formation of flash on the sheet 5 by preventing leakage of the gasket forming material from the gasket forming cavity 35, thus eliminating the step of removing any such flash. Moreover, the outwardly angled facing portion 27, by undercutting the interior face 37 (i.e., the face directed towards the interior of the mold apparatus 1), avoids leaving an exposed or exterior face portion of the gasket 2 which is not smooth and aesthetically acceptable. In short, the portion of the gasket 2 which is formed by the interior face 37 of the gasket forming cavity 35 is not generally exposed to view.

Figure 3B:
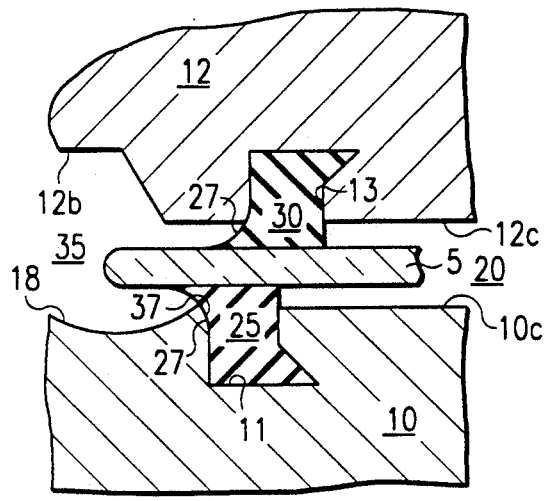
FIGS. 3B and 3C are enlarged fragmentary sectional views, each taken along line 3—3 of FIG. 1, showing alternative embodiments of the seal.
Figure 3C:
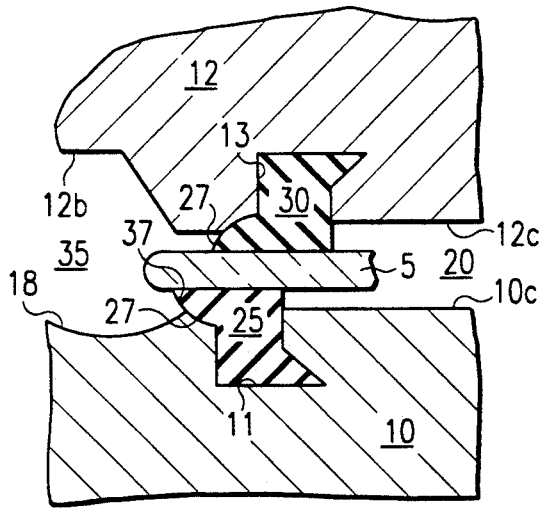

The angle from the vertical plane defined by the outwardly angled facing portion 27 need not be 45°, however, and the outwardly angled facing portion 27 need not be linear in shape. For example, the outwardly angled facing portion 27 could be parabolic in shape, with the vertex of the parabolic shape located either on the surface of the sheet 5 or on the seal 25 and with the outwardly angled facing portion 27 of seal 25 defining a portion of the parabolic shape. Examples of such alternative shapes of seal 25 are shown in FIGS. 3B and 3C. Thus, the term "angled" as used herein includes shapes besides those which are merely linear and those which form a specific angle with the vertical (or horizontal) plane.

As can be seen, the seal 25 prevents the formation of flash on the surface of the sheet 5 by preventing leakage of the gasket forming material from the gasket forming cavity 35. The seal 25 thereby eliminates the additional steps and costs involved in removing such flash. In this embodiment, the face portion of the gasket 2 which will be exposed to view when the window gasket assembly 50 is installed on a vehicle is formed adjacent a finishing surface 18 of the mold section 10. Typically, the finishing surface 18 is a part of the recessed portion 10b. It will be understood, however, that all of the recessed portion 10b can constitute a finishing surface 18. The finishing surface 18 preferably is smooth and rigid so as to provide the gasket 2 as formed with a smooth and aesthetically acceptable exterior finish on its exposed face portion. Thus, the invention allows forming a gasket 2 with an aesthetically acceptable face while at the same time the seal 25 avoids the formation of flash on the surface of the sheet 5 which then would need to be removed.

In an alternative embodiment (not shown), the resilient mold section 12 can be used to contact the sheet 5 without the use of the seal 30. In such an alternative embodiment, the mold section 12 could have a downwardly extending portion for contact with the sheet 5, with such a portion extending outwardly from the sheet receiving chamber 20 as the seal 30 described above.

Figure 4:
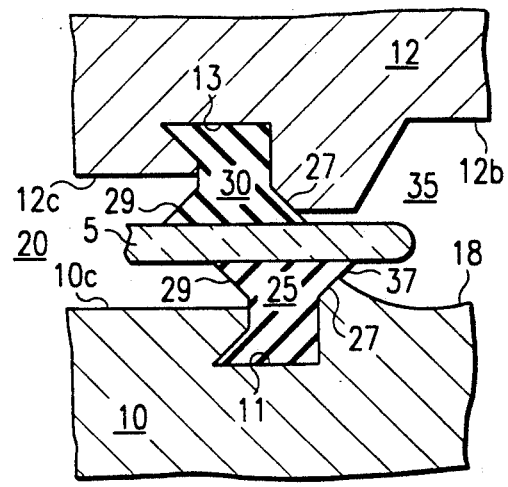
FIG. 4 is an enlarged fragmentary sectional view of the mold apparatus, showing the preferred embodiment of the seal.

Referring now to FIG. 4, the preferred embodiment of the seals 25 and 30 is shown. FIG. 4 is also an enlarged fragmentary sectional view of the seals, but it should be noted for ease of reference that the gasket forming cavity 35 is on the right-hand side of FIG. 4, whereas in FIGS. 3A, 3B, and 3C, the gasket forming cavity 35 is shown on the left-hand side. As in the embodiment of FIG. 3A, the seals 25 and 30 both have an outwardly angled facing portion 27. In the embodiment of FIG. 4, each of seals 25 and 30 also have an inwardly angled facing portion 29, which extends towards the interior of the mold apparatus 1. The inwardly angled facing portion 29 of each of the seals 25 and 30 extends towards the interior of the mold apparatus at an angle of about 45° from the vertical plane. The use of the inwardly extending angled facing portion 29 on each of the seals 25 and 30 provides a greater amount of surface contact between each of the seals 25 and 30 and the sheet 5, thus providing greater support for and stability in connection with the positioning of the sheet 5 within the mold apparatus 1 and further enhancing the ability of the seals 25 and 30 to prevent any leakage of the gasket forming material into the sheet receiving chamber 20 and to prevent the formation of flash on the sheet 5. The inwardly extending angled facing portion 29 also allows the pressure at which a gasket forming material is injected into the mold apparatus 1 to be increased without damaging the sheet 5 or forming flash on the sheet 5.

FIG. 5 shows an enlarged sectional view of an alternative and preferred embodiment of the present invention. In this preferred embodiment, the mold apparatus 1 includes a rigid mold section 10, a resilient mold section 12, and, positioned within the rigid mold section 10, a rigid member 45 having a finishing surface 48. In a preferred embodiment of the invention, the rigid member 45 is made of steel. However, the rigid member 45 may be made of other metals besides steel and other rigid materials as well.

As shown in FIG. 5, the rigid member 45 is positioned within a groove 15 in the facing surface of the rigid mold section 10. In this embodiment of the invention, the rigid member 45 has a polished steel finishing surface 48 for providing a smooth and aesthetically acceptable finish on the gasket 2 to be formed within the gasket forming cavity 35. Thus, when the mold sections 10 and 12 are brought together and the mold apparatus 1 is closed, the finishing surface 48 of the rigid member 45 cooperates with the seals 25 and 30 and the sheet 5 to define the gasket forming cavity 35. The finishing surface 48 of the rigid member 45 typically corresponds to an exterior or exposed face portion 49 (shown in FIG. 10) of the gasket 2 to be formed within the gasket forming cavity 35, thereby providing an aesthetically acceptable exterior face portion for the window gasket assembly 50.

Figure 6:
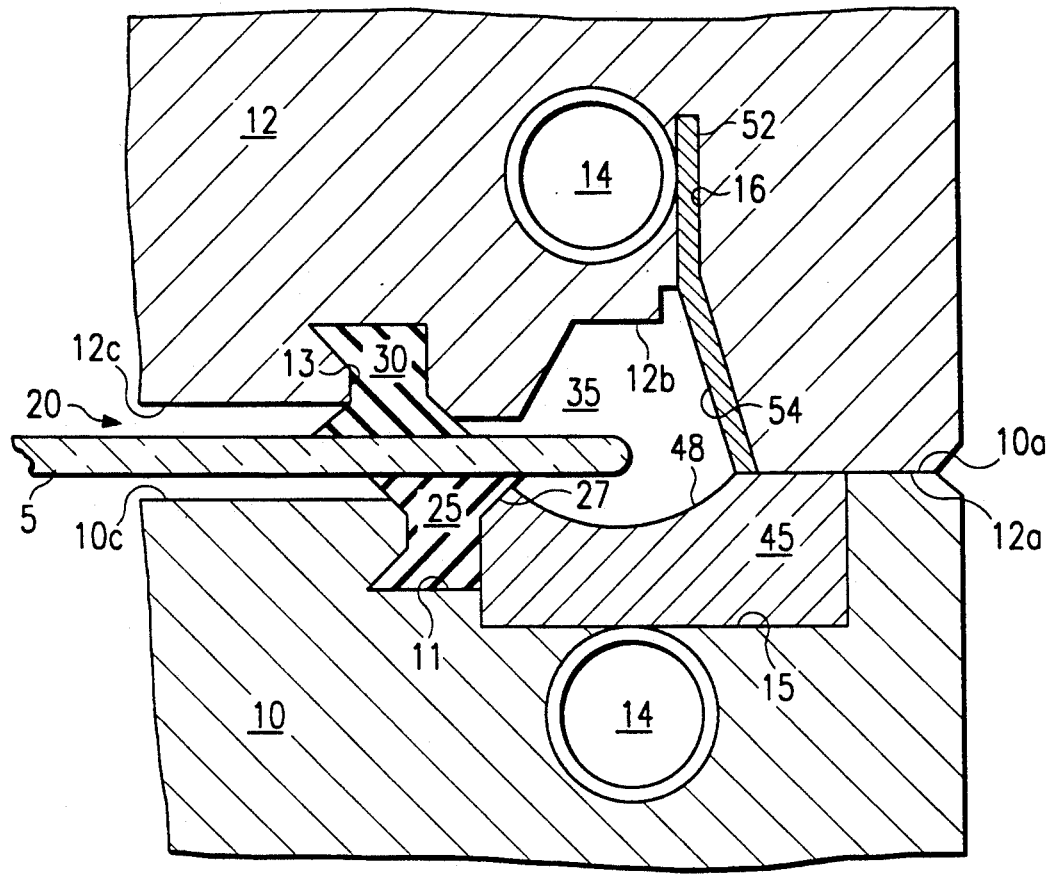
FIG. 6 is an enlarged fragmentary sectional view of another alternative embodiment of the mold apparatus, showing the mold apparatus in a closed position.

Referring now to FIG. 6, an alternative embodiment of the invention is shown. In FIG. 6, the mold section 10 has positioned therewithin a rigid member 45, similarly as in the embodiment of FIG. 5. In addition, the mold section 12 has positioned therewithin a rigid member 52. The mold section 12 has a groove 16 which holds the rigid member 52 within mold section 12. The rigid member 52 has a finishing surface 54 Which cooperates to define a portion of the gasket forming cavity 35 so that at least one face portion of the gasket forming cavity 35, which corresponds to a face portion (not shown) of the gasket 2 on which a smooth finish is desired to be formed, is defined by the finishing surface 54.

It will be understood that the finishing surfaces 54 and 48 can be used so as to provide one or more smoothly finished face portions or surfaces anywhere on the gasket 2 to be formed. Normally, only those face portions of gasket 2 which will be exposed to view when the window gasket assembly 50 is installed on a vehicle need to have a smooth and aesthetically acceptable finish. Those skilled in the art will further understand that the shapes and dimensions of the finishing surfaces 48 and 54 of the rigid members 45 and 52 can be varied to provide one or more face portions of the gasket 2 according to the requirements or specifications for the gasket 2 to be formed. In this alternative embodiment of the invention, the finishing surfaces 48 and 54 are steel surfaces which have been prepared by polishing to obtain smooth surfaces. The preparation of the polished finishing surfaces 48 and 54 can be done by hand or with tools and equipment which are known in the art.

FIG. 7 shows a sectional view of the preferred embodiment of the present invention with the mold apparatus 1 shown in an open position. The molded window gasket assembly 50, including the sheet 5 and the gasket 2, is shown readied for removal from between the lower mold section 10 and the upper mold section 12.

FIGS. 8 and 9 show the preferred embodiment of an aftermixer 4, which is used in the preferred embodiment of the invention to further mix the elements of the gasket forming material prior to the injection of the gasket forming material into the mold apparatus 1. As shown in FIGS. 8 and 9, aftermixer 4 includes an inlet 60 and a number of generally triangular shaped grooves 62 which serve to separate and then reunite a stream of the gasket forming material as it flows through the aftermixer 4.

In the preferred embodiment of the invention, the aftermixer 4 shown in FIGS. 8 and 9 is used. As shown in FIGS. 8 and 9, the aftermixer 4 comprises an upper section 64 and a lower section 65, both of which contain a number of alternating grooves 62. The grooves 62 alternate in the upper and lower aftermixer sections 64 and 65 so that when a charge of the gasket forming material is injected into the aftermixer 4, about one-half of the charge stream flows through a groove 62 in the lower aftermixer section 65, while the remainder flows through a groove 62 in the upper aftermixer section 64. The first groove 62 in the upper aftermixer section 64, in turn, is in fluid communication with a generally wing-shaped channel formed by grooves 62, in which the wing-shaped channel extends outwardly from the center of the aftermixer 4, in the lower aftermixer section 65. The first or initial groove 62 in the lower aftermixer section 65, in turn, is in fluid communication with a similarly and generally wing-shaped channel formed by grooves 62 in the upper aftermixer section 64. These two generally wing-shaped channels formed by the grooves 62 are in fluid communication with each other at a corresponding inward center portion 66. The generally wing-shaped portions formed by the grooves 62 repeat this pattern twice and then the streams of the gasket forming material are reunited at an inward center portion 66 which is located at the opening of inlet channel 3.

Figure 10:
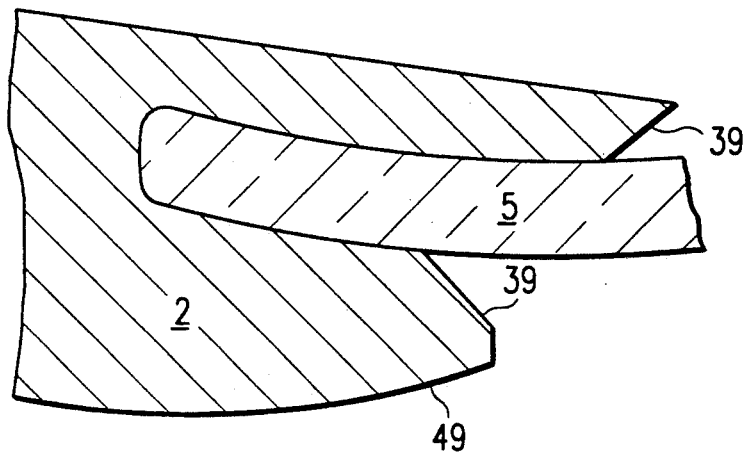
FIG. 10 is an enlarged sectional view of the formed window gasket assembly.

FIG. 10 shows an enlarged section of the window gasket assembly 50, which includes the sheet 5 and the gasket 2. As shown in FIG. 10, the gasket 2 encapsulates a peripheral edge of the sheet 5. The gasket 2 has a face portion 49 which will be exposed to view when the window gasket assembly 50 is installed in a vehicle. As shown in FIG. 10, the gasket further has undercut portions 39. The undercut portions 39 are formed by the seals 25 and 30 and are angled towards the sheet 5 and outwardly from the center or interior surface area of the sheet 5. The center, or interior, surface area of the sheet 5 refers to the surface area located inwardly of the peripheral edges of the sheet 5 and corresponds to the center of the mold apparatus 1 when the sheet 5 is positioned in the sheet receiving chamber 20 of the mold apparatus 1. Such undercut portions 39 are advantageous because they are not exposed to view when the window gasket assembly 50 is installed in a vehicle and generally require no further work (as is the case with the removal of flash).

An embodiment of the process of molding a window gasket assembly using the mold apparatus 1 of FIGS. 5 and 7 will now be described. Prior to the formation of the gasket 2, the sheet 5 is preferably cleaned and coated with a primer, at least in the area where the gasket 2 is to be formed on the sheet 5. For cleaning, any appropriate solvent may be used, such as alcohol or ammonia. Preferably, the cleaning solvent used is a primer commercially available from Essex, product number 435.18. A second primer layer, preferably a primer commercially available from Essex, product number 435.20A, may be used to assist in bonding the sheet 5 and the gasket 2. After cleaning and after the primer is applied to the sheet 5, a drying period is provided which may vary anywhere from 5 minutes to 96 hours depending upon temperature and humidity conditions, but which typically lasts 15–20 minutes. After drying, the sheet 5 is then positioned within the sheet receiving chamber 20 of mold apparatus 1.

The system and equipment for injecting the gasket forming material to form the gasket 2 may be of the type commonly used in reaction injection molding processes. Such a system generally includes supplies of and means for supplying a blend of an isocyanate, a polyol, and a catalyst, all of which can be separately metered by metering pumps (not shown) and supplied to mixing means (not shown) at a pressure in the range of approximately 2800 to 3000 psi, and applied to the mold apparatus 1 from a source of the gasket forming material (not shown) through the aftermixer 4 (shown in FIGS. 8 and 9) and inlet channel 3 at pressures of approximately 200 to 300 psi. The blend of an isocyanate, a polyol, and a catalyst further includes a dye in a preferred embodiment of the invention. The dye can be black, red, blue, or any other color or tint desired.

The mold apparatus is preferably maintained at a substantially stable temperature in the range of 150° to 180° F., and is treated with a mold release agent. The mold sections 10 and 12 are preferably treated with BASF POUR 5000 as the mold release agent.

In a specific example, which is to be construed as illustrative and not as limiting, a gasket forming material comprised of 70 parts by weight isocyanate and 100 parts by weight polyol was injected into the mold apparatus 1 through an aftermixer 4 and inlet channel 3 at a pressure of about 300 psi. The isocyanate and polyol streams were at a temperature of approximately 90° F., while the mold apparatus was at a temperature of approximately 160° F. The time allowed for curing was approximately sixty seconds. The compositions used in this example were isocyanate and polyol, sold under the product names SPECTRIM 10A and SPECTRIM 10B, respectively, by The Dow Chemical Company. After allowing the gasket forming material to cure, or to at least partially cure, the mold apparatus 1 was opened and the window gasket assembly 50 comprising the sheet 5 and the gasket 2 formed thereon was removed.

In the preferred embodiment of the invention, the mold section 10 is coated with a protective coating or layer prior to the closing of the mold apparatus 1 and the injection of the gasket forming material. The protective coating or layer is of a material which protects the polyurethane gasket 2 from possible degradation due to exposure to ultraviolet (UV) radiation, such as is normally present in unfiltered sunlight. Such a protective coating also can be provided by mixing the protective material, which may be a paint with a UV screening element, with the isocyanate and polyol blend of the gasket forming material or by painting the window gasket assembly 50 after the formation of the gasket 2 on the sheet 5. It is preferred to provide the protective coating by spraying the mold section 10 with System No. VL 8-3563FO, gloss black in-mold coating, which is commercially available from Titan Finishes, prior to the injection of the gasket forming material. In the preferred embodiment of the invention, the mold section 10 is coated by spray-painting the coating onto the mold section 10 with a standard paint sprayer of a type which is well known in the art prior to the positioning of the sheet 5 on the mold section 10. Other means for applying the coating could be employed, however, such as by brushing the paint onto the mold section 10.

The foregoing discussion discloses and describes the preferred embodiment of the present invention. Those skilled in the art will recognize from the foregoing discussion that various changes, modifications, and variations may be made thereto without departing from the spirit and scope of the invention as defined in the claims.

I claim:

1. A mold apparatus for forming a gasket on a portion of a sheet comprising:
   at least two cooperating mold sections having facing surfaces defining a chamber for receiving a sheet having a peripheral edge; and
   a first seal positioned in the first of said mold sections to support the sheet within the sheet receiving chamber, wherein said first seal has an outer side which has a facing portion angled outwardly from the horizontal facing surface of said first mold section and towards the peripheral edge of the sheet;
   a second seal in the second of said mold sections wherein said second seal has an outer side;
   and wherein the facing surface of said first mold section has a gasket shaping portion which cooperates with the angled facing portion of said first seal, at least a portion of the facing surface of said second mold section, and at least a portion of the outer side of said second seal to define a gasket forming cavity having an interior face defined by the angled facing portion of said first seal between the sheet and the facing surface of said first mold section.

2. The mold apparatus according to claim 1 further comprising a plurality of stopping pins attached to said mold sections, wherein said stopping pins are adapted to engage one another and are attached to said mold sections outside of the gasket forming cavity.

3. The mold apparatus according to claim 1 wherein at least a portion of the facing surfaces of said mold sections located outwardly of the gasket forming cavity are adapted to contact one another to define the dimensions of the gasket forming cavity when said mold sections are in contacting relationship.

4. The mold apparatus according to claim 1 further comprising an inlet channel in fluid communication with the gasket forming cavity and the exterior of the mold apparatus.

5. The mold apparatus according to claim 1 further comprising at least one outlet channel in fluid communication with the gasket forming cavity and the exterior of the mold apparatus.

6. The mold apparatus according to claim 4 further comprising an aftermixer in fluid communication with the inlet channel.

7. The mold apparatus according to claim 1 further comprising means for controlling the temperature of the gasket forming cavity.

8. The mold apparatus according to claim 7 wherein said means for controlling the temperature of the gasket forming cavity comprises cavities in at least one of said mold sections for receiving a fluid.

9. The mold apparatus according to claim 1 wherein said first mold section has a groove therein, with said first seal disposed within the groove in said first mold section.

10. The mold apparatus according to claim 1 wherein said first mold section has a groove therein for removably holding said first seal and said second mold section has a groove therein for removably holding said second seal.

11. The mold apparatus according to claim 1 wherein said second mold section comprises a resilient material and said second seal is formed by a portion of the facing surface of said second mold section.

12. The mold apparatus according to claim 11 wherein said mold section comprising a resilient material has a Shore durometer hardness of approximately 50.

13. The mold apparatus according to claim 11 wherein one of said mold sections further comprises at least one rigid member having at least one finishing surface positioned so that the finishing surface of said rigid member defines a face portion of the gasket forming cavity.

14. The mold apparatus according to claim 11 wherein at least one of said mold sections comprises a plurality of rigid members, each having a finishing surface and each positioned so that the finishing surfaces of said rigid members define at least one face portion of the gasket forming cavity.

15. The mold apparatus according to claim 11 wherein at least one of said mold sections comprises a plurality of rigid members, each having a finishing surface and each positioned so that the finishing surfaces of said rigid members define a plurality of face portions of the gasket forming cavity.

16. The mold apparatus according to claim 13 wherein said rigid member comprises a metal.

17. The mold apparatus according to claim 13 wherein said rigid member comprises steel and the finishing surface is a polished surface area.

18. The mold apparatus according to claim 11 further comprising at least one rigid member having at least one finishing surface positioned within at least one of said mold sections, wherein the finishing surface of said rigid member, the gasket shaping portion of at least one of said mold sections, said seal, and the sheet cooperate to define a gasket forming cavity wherein the finishing surface of said rigid member defines a face portion of the gasket forming cavity.

19. The mold apparatus according to claim 13 wherein said rigid member having a finishing surface is positioned Within said mold section comprising a rigid material.

20. The mold apparatus according to claim 1 wherein said first seal has a facing portion extending inwardly to the chamber.

21. The mold apparatus according to claim 11 wherein said resilient material comprises a resilient resin.

22. The mold apparatus according to claim 13 wherein said rigid member is removably positioned within said first mold section.

23. The mold apparatus according to claim 1 wherein said first seal comprises silicone.

24. A mold apparatus for forming a gasket on a portion of a sheet comprising:
   first and second mold sections having facing surfaces which cooperate to define a chamber for receiving a peripheral edge of a sheet, wherein said first mold section comprises a resilient material and said second mold section comprises a rigid material, and wherein the facing surface of said first mold section has a gasket shaping portion;
   first and second seals positioned in the facing surfaces of said first and second mold sections, respectively, for supporting the sheet within the chamber, wherein each of said seals has an outer side which has a facing portion angled outwardly from the horizontal facing surface of the mold section in which it is positioned and towards the peripheral edge of the sheet; and
   at least one rigid member having at least one finishing surface positioned within said second mold section, wherein the finishing surface of said rigid member, the gasket shaping portion of the facing surface of said first mold section, the angled facing portion of said seals, and the sheet cooperate to define a gasket forming cavity wherein the finishing surface of said rigid member defines at least one face portion of the gasket forming cavity.

25. A mold apparatus for forming a gasket on a portion of a sheet comprising:
   first and second mold sections having facing surfaces which cooperate to define a chamber for receiving a peripheral edge of a sheet, wherein said first mold section comprises a resilient material and said second mold section comprises rigid material, and wherein each of the facing surfaces has a groove therein and the facing surface of said first mold section has a gasket shaping portion;
   first and second seals positioned in the grooves of the facing surfaces of said first and second mold sections, receptively, for supporting the sheet within the sheet receiving chamber, wherein each of said seals has an outer side which has a facing portion angled outwardly from the horizontal facing surface of the mold section in which it is positioned and towards the peripheral edge of the sheet; and
   a plurality of rigid members each having at least one finishing surface and positioned within at least one of said first and second mold sections, wherein the finishing surfaces of said rigid members, the gasket shaping portion of the facing surface of said first mold section, the angled facing portions of said seals, and the sheet cooperate to define a gasket forming cavity wherein the finishing surfaces of said rigid members define at least one face portion of the gasket forming cavity.

26. The mold apparatus according to claim 25 wherein the finishing surfaces of said rigid members, the gasket shaping portion of the facing surface of said first mold section, said seals and the sheet cooperate to define a gasket forming cavity wherein the finishing surfaces of said rigid members define a plurality of face portions of the gasket forming cavity.

* * * * *